United States Patent
Sarma et al.

(10) Patent No.: US 10,536,539 B2
(45) Date of Patent: Jan. 14, 2020

(54) DATA SESSIONIZATION

(71) Applicant: Oath Inc., New York, NY (US)

(72) Inventors: Akshai Sarma, Sunnyvale, CA (US); Michael Natkovich, San Francisco, CA (US); Joshua Walters, Irvine, CA (US)

(73) Assignee: Oath Inc., New York, NY (US)

( * ) Notice: Subject to any disclaimer, the term of this patent is extended or adjusted under 35 U.S.C. 154(b) by 295 days.

(21) Appl. No.: 14/717,119

(22) Filed: May 20, 2015

(65) Prior Publication Data

US 2016/0344826 A1 Nov. 24, 2016

(51) Int. Cl.
*G06F 15/173* (2006.01)
*H04L 29/08* (2006.01)

(52) U.S. Cl.
CPC ............ *H04L 67/22* (2013.01); *H04L 67/142* (2013.01); *H04L 67/02* (2013.01)

(58) Field of Classification Search
CPC ................................ H04L 67/22; H04L 67/02
USPC ......................................................... 709/224
See application file for complete search history.

(56) References Cited

U.S. PATENT DOCUMENTS

| | | | | |
|---|---|---|---|---|
| 2002/0087679 | A1* | 7/2002 | Pulley | G06Q 30/02 709/224 |
| 2008/0086558 | A1* | 4/2008 | Bahadori | G06F 11/3438 709/224 |
| 2008/0126538 | A1* | 5/2008 | Uyama | G06Q 30/0202 709/224 |
| 2011/0119374 | A1* | 5/2011 | Ruhl | G06F 17/3089 709/224 |
| 2013/0179564 | A1* | 7/2013 | Yasuie | H04L 63/20 709/224 |
| 2013/0297778 | A1* | 11/2013 | Hong | G06F 17/3089 709/224 |
| 2014/0172813 | A1* | 6/2014 | Yan | G06F 17/30864 707/706 |

(Continued)

OTHER PUBLICATIONS

Title: Characterizing the Influence of Domain Expertise on Web Search Behavior Authors: Ryen W. White, Susan T. Dumais, Jaime Teevan Publication date: Feb. 2009 Publisher: WSDM '09 Proceedings of the Second ACM International Conference on Web Search and Data Mining.*

*Primary Examiner* — Umar Cheema
*Assistant Examiner* — Hannah S Wang
(74) *Attorney, Agent, or Firm* — Cooper Legal Group, LLC

(57) ABSTRACT

Users may interact with a multitude of content on content sources. Content sources may desire to identify sessions that the user created. As provided herein, a user interacting with a content source may be identified. Source data and session data regarding the user interaction may be extracted. A data pipeline may be generated based upon the source data and the session data. The data pipeline may be sessionized into a single data feed based upon a finished current events interval (e.g., sessions that are activated and terminated during a first interval), a finished last events interval (e.g., sessions that are activated during the first interval and terminated during a second interval), a second finished current events interval (e.g., sessions that are activated and terminated during the second interval), and/or a second finished last events interval (e.g., sessions that are activated during the second interval and terminated during a third interval).

20 Claims, 10 Drawing Sheets

(56) References Cited

U.S. PATENT DOCUMENTS

| | | | | |
|---|---|---|---|---|
| 2014/0379428 A1* | 12/2014 | Phansalkar | ............. | H04L 67/22 |
| | | | | 705/7.32 |
| 2015/0256475 A1* | 9/2015 | Suman | ................. | G06F 9/5027 |
| | | | | 709/226 |
| 2015/0278837 A1* | 10/2015 | Lahav | ................ | G06Q 30/0204 |
| | | | | 705/7.33 |
| 2016/0219089 A1* | 7/2016 | Murthy | ............... | H04L 65/4076 |

* cited by examiner

DATA SESSIONIZATION

BACKGROUND

When users access and utilize a content source, a session data feed and an extract, transform, load (ETL) data feed may be generated. To sessionize data (e.g., organize user data into sessions) the session data feed and the ETL data feed may be combined. A session may utilize information from a future interval to compute metrics for events in a current interval. Similarly, sessions in the future interval may utilize information from the current interval to compute metrics for events in the future interval. For example, if the current interval has a duration of 30 minutes (e.g., from 10:00 AM to 10:30 AM), the future interval has a second duration of 30 minutes (e.g., from 10:30 AM to 11:00 AM), and the user is interacting with the content source on multiple web pages from 10:01 AM to 10:37 AM, then the entirety of events occurring on the web pages that the user interacted with during the current interval may be sent to an interval processing component to process the future interval. Unfortunately, the web pages that the user interacted with during the current interval may comprise a large amount of data that is sent for computing metrics for the future interval, but merely a smaller subset of the data (e.g., less than the entirety of web pages that the user interacted with during the current interval) may be needed to compute metrics for the future interval.

SUMMARY

In accordance with the present disclosure, one or more systems and/or methods for sessionizing data are provided. In an example, a user interacting with a content source may be identified. Source data (e.g., extract, transform, load (ETL) data) and/or session data regarding a user interaction, of the user, with the content source may be extracted. A data pipeline may be created based upon the source data and the session data. The data pipeline may be sessionized into a data feed based upon a finished current events interval, a finished last events interval, a second finished current events interval, and/or a second finished last events interval. The finished current events interval may comprise one or more sessions of the content source that are activated and terminated during a first interval. The finished last events interval may comprise one or more sessions of the content source that are activated during the first interval and terminated during a second interval. The second finished current events interval may comprise one or more sessions of the content source that are activated and terminated during the second interval. The second finished last events interval may comprise one or more sessions of the content source that are activated during the second interval and terminated during a third interval.

A session may be terminated based upon a session timeout interval (e.g., a duration equal to or less than at least one of the first interval, the second interval, or the third interval) occurring without the user interacting with content of the content source and/or the user terminating the session with the content source. The finished current events interval, the finished last events interval, the second finished current events interval, and the second finished last events interval may be published, after the third interval, to create a published data feed. The data feed may correspond to sessions, of the user, of the content source during the first interval and the second interval. The data feed may be utilized to identify a metric pattern. In an example, the metric pattern may comprise an amount of time the user is interacting with content from the content source, a number of sessions the user generates over a time period, a number of sessions the user generates over a network, and/or a number of sessions the user generates within a content domain. The metric pattern may be evaluated, and operation of the content source may be altered based upon the metric pattern.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
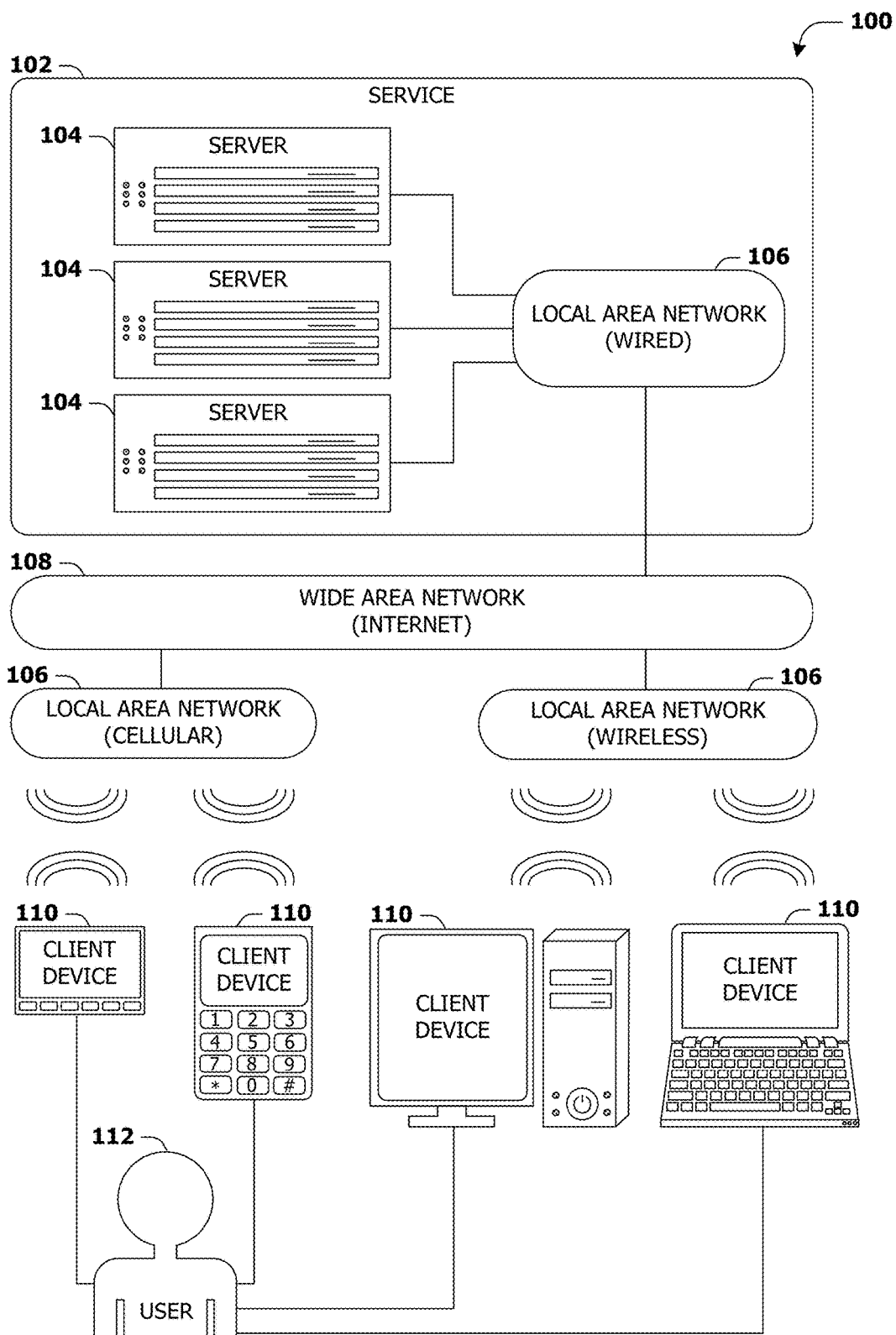
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fibre Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi network or a Bluetooth personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
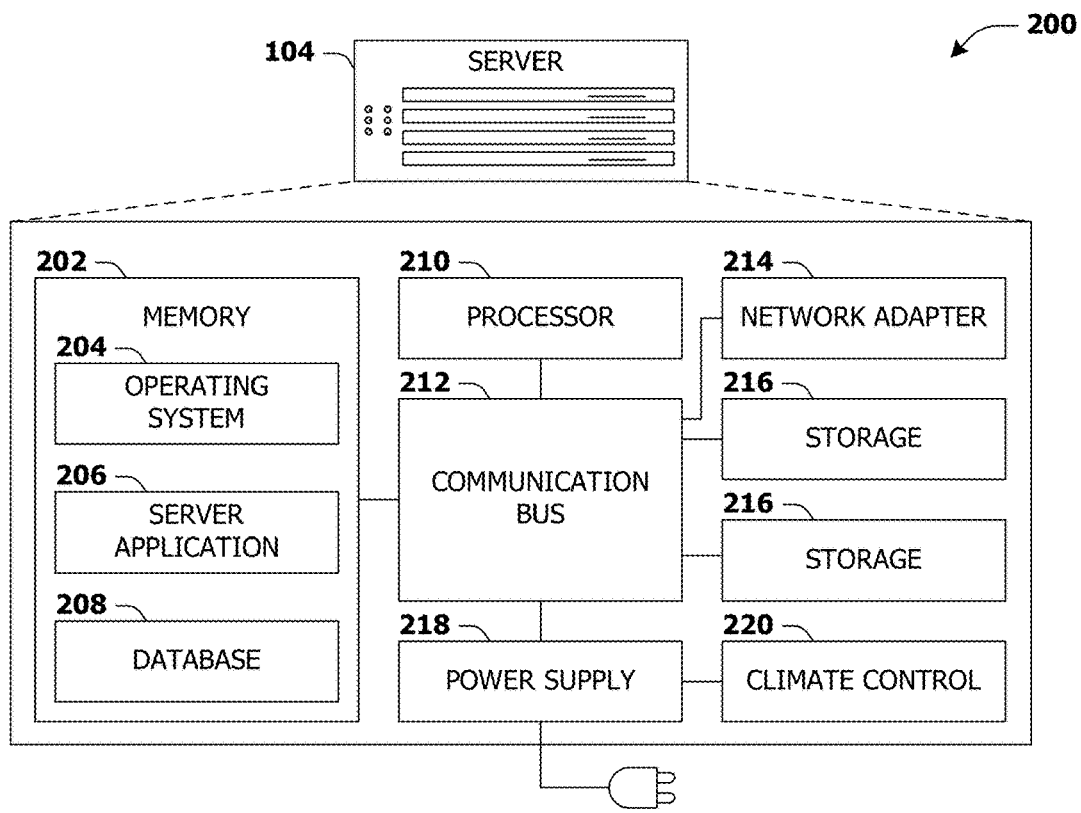
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
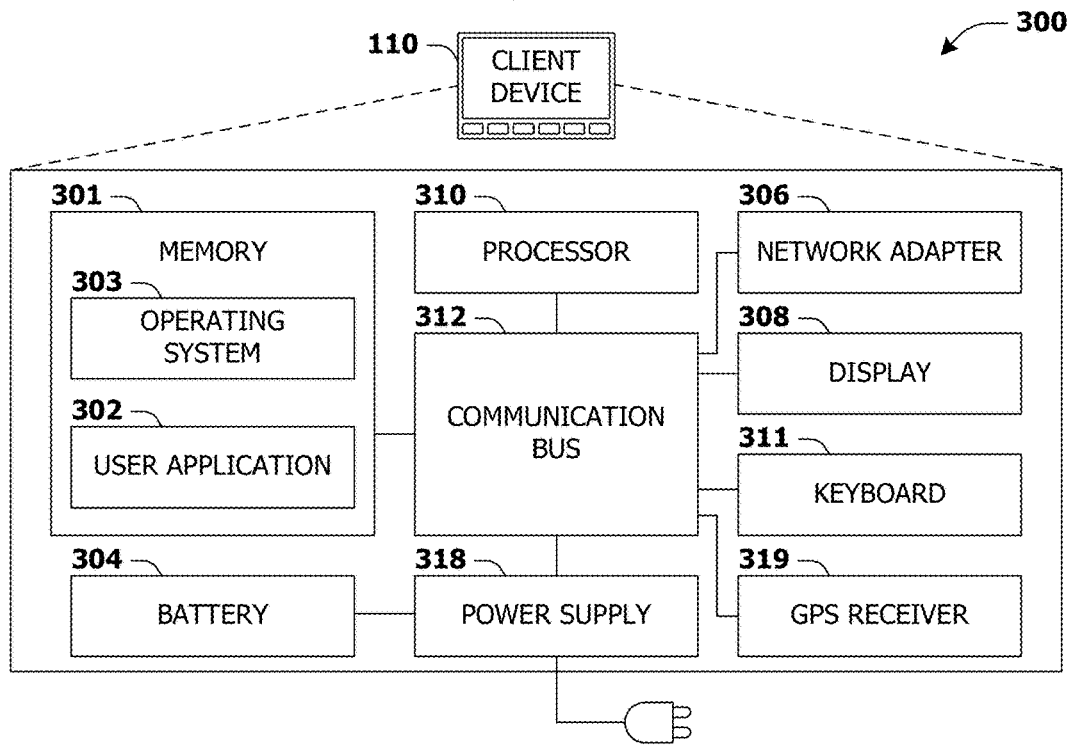
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more systems and/or techniques for sessionizing data are provided. Content sources may desire to determine how, when, for how long, and/or other information regarding how users are interacting with content. The content sources may generate a session data feed and a source data feed (e.g., an extract, transform, load (ETL) data feed) to determine how users are interacting with the content. Session data and source data may be combined to sessionize data (e.g., organize user data into sessions). Joining two data feeds (e.g., the session data feed and the source data feed) may be resource and time intensive.

As provided herein, the session data may be included inline with the source data to generate a single data feed. A data pipeline may be created based upon the source data and session data, and may be evaluated to sessionize the data pipeline into a data feed. The data feed may be based upon a finished current events interval (e.g., comprising one or more sessions of the content source that are activated and terminated during a first interval), a finished last events interval (e.g., comprising one or more sessions of the content source that are activated during the first interval and terminated during a second interval), a second finished current events interval (e.g., comprising one or more sessions of the content source that are activated and terminated during the second interval), and a second finished last events interval (e.g., comprising one or more sessions of the content source that are activated during the second interval and terminated during a third interval). The data feed may be published, and may be used to identify a metric pattern indicative of user consumption of content from the content source.

The ability to provide content sources with the data feed (e.g., a single data feed rather than two data feeds) may reduce network bandwidth, time, and/or computing resources otherwise utilized to sessionize two data feeds.

Otherwise, many content sources may resort to joining the session data feed and the source data feed, which is a computationally expensive and slow. Including the session data and the source data inline in a single data feed may reduce power and network bandwidth use by a magnitude of 3 or more and increase processing speeds by a magnitude of 3 or more, as compared to content sources that do not include the session data feed inline with the source data feed.

Figure 4A:
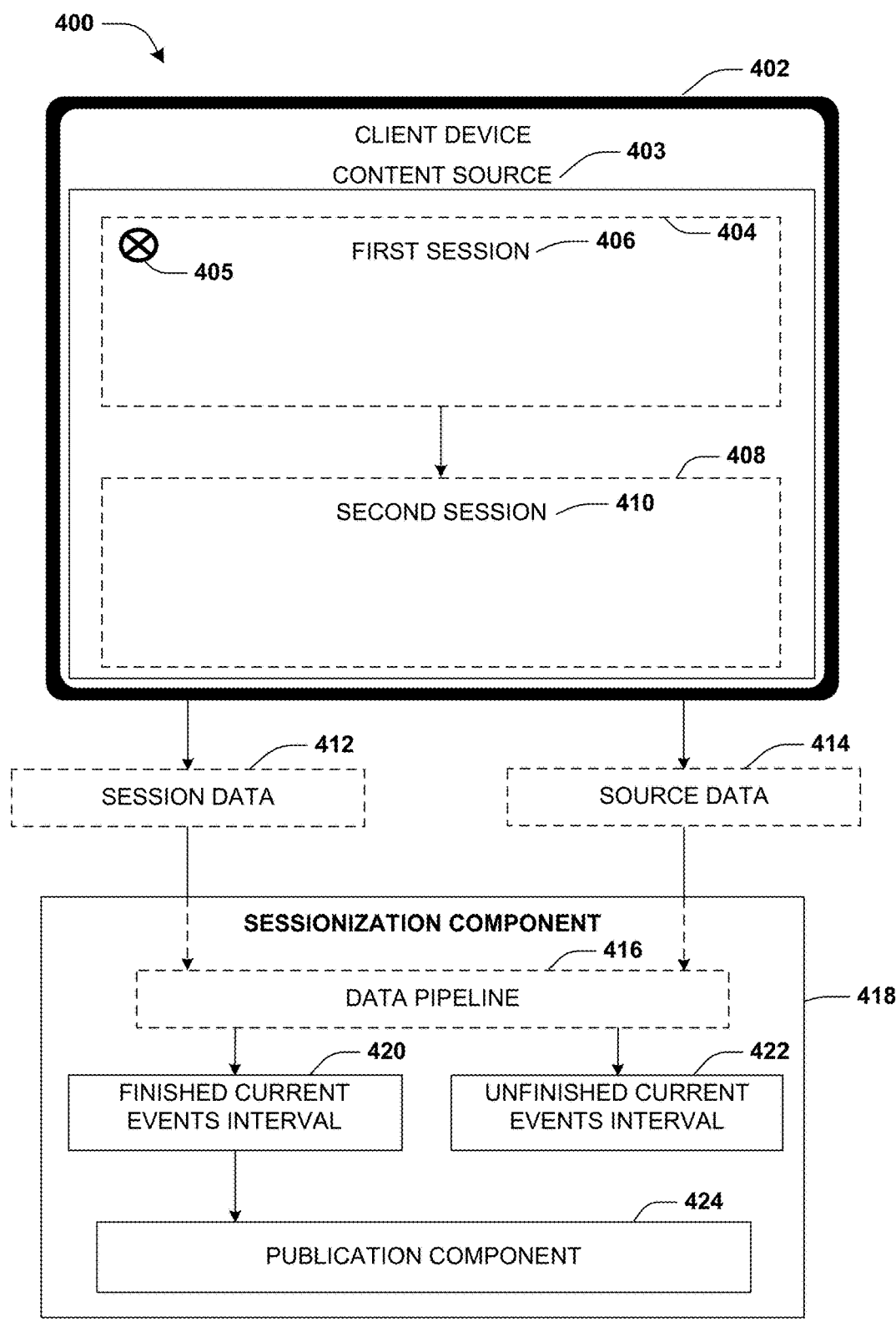
FIG. 4A is a component block diagram illustrating an example system for sessionizing data, where a first session and a second session are generated.
Figure 4B:
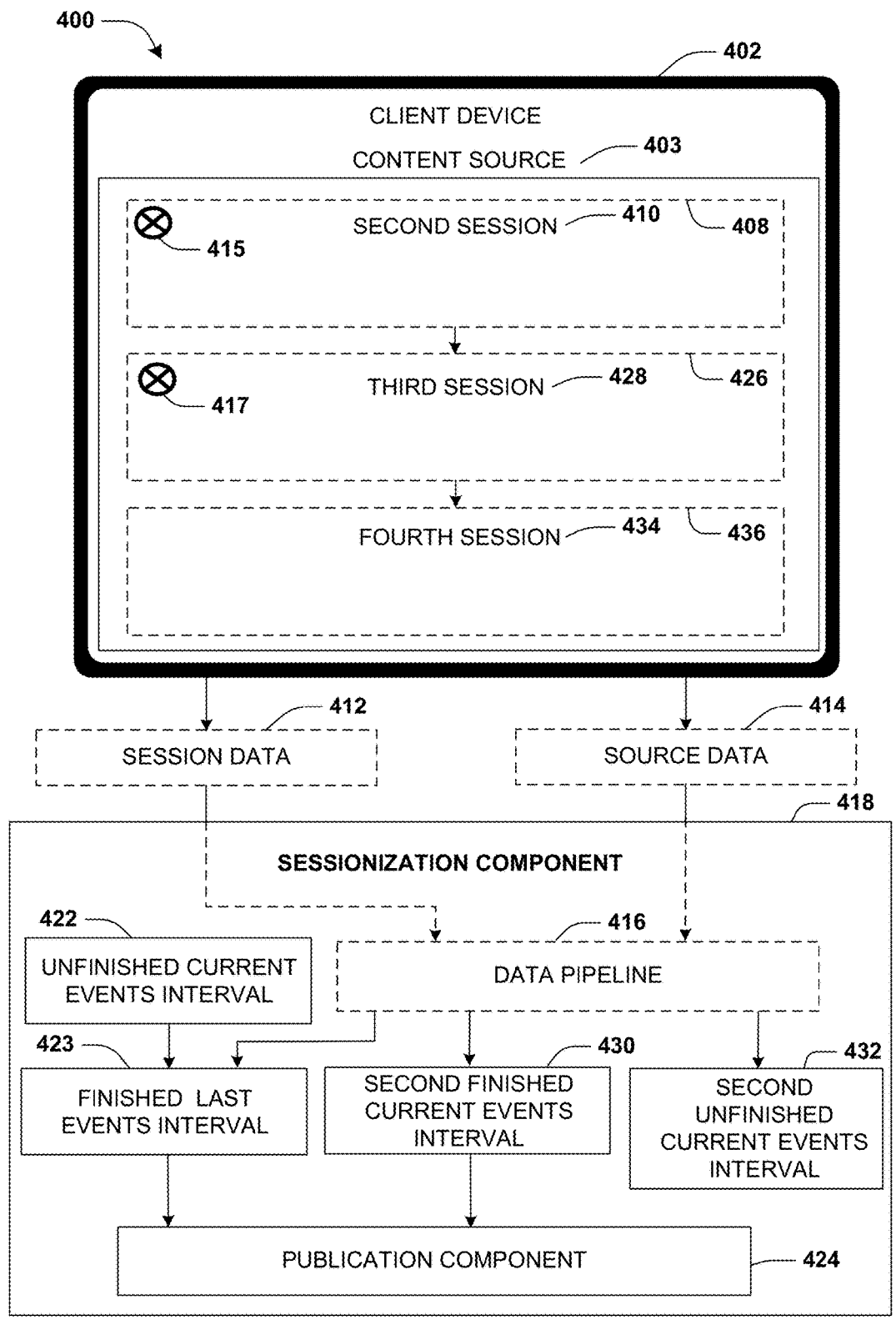
FIG. 4B is a component block diagram illustrating an example system for sessionizing data, where a second session, a third session, and a fourth session are generated and the second session and the third session are terminated.
Figure 4C:
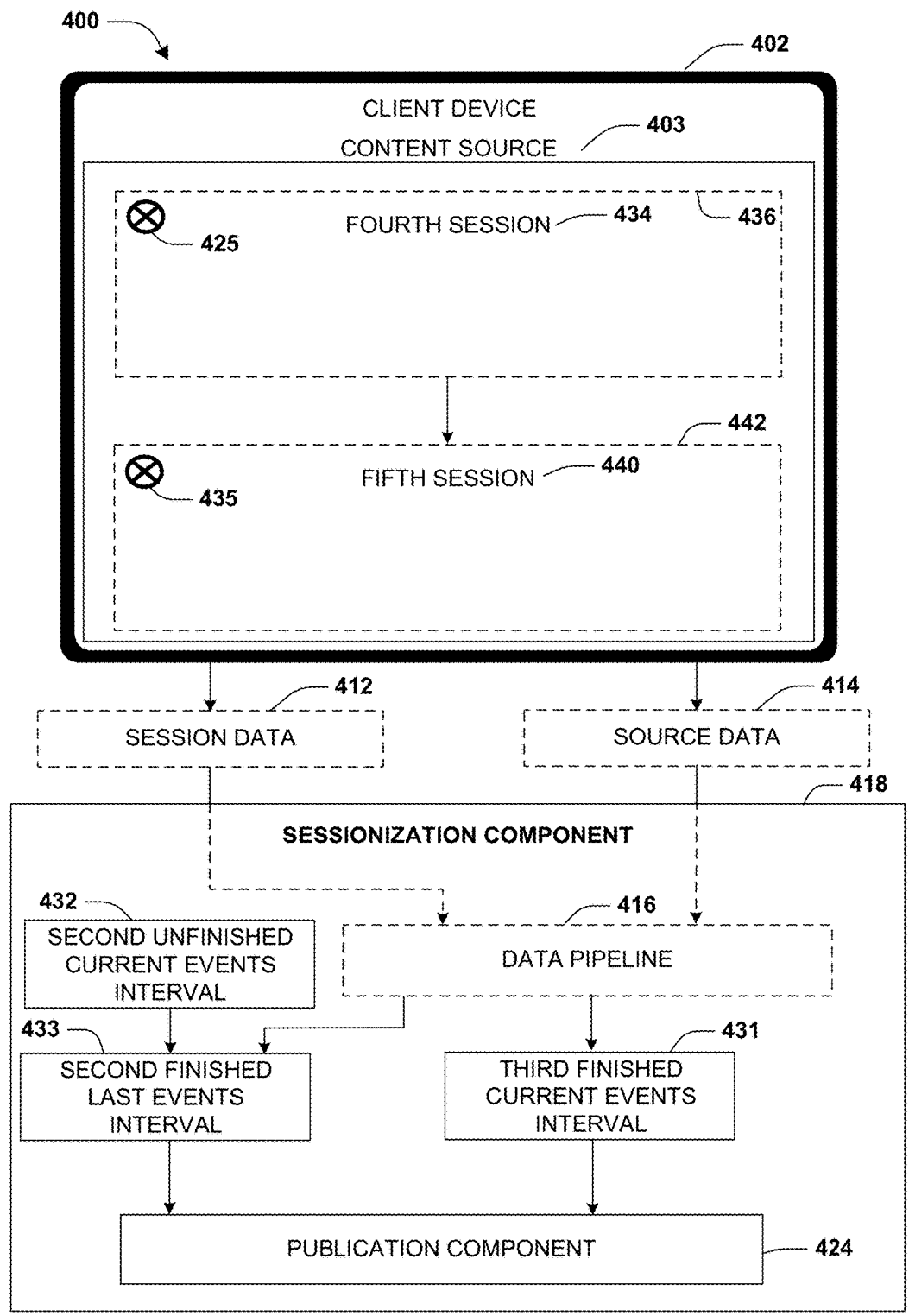
FIG. 4C is a component block diagram illustrating an example system for sessionizing data, where a fourth session is terminated.

FIGS. 4A-4C illustrate examples of a system 400, comprising a sessionization component 418, for sessionizing user data. A user, on a client device 402, may access content through a content source 403 (e.g., the content source 403 may provide access to content from a content provider that may be remote to the client device 402, such as a website hosted by a webserver). The user may access a webpage 404 during a first interval. In an example, the first interval may comprise a duration of 30 minutes (e.g., from 1:00 PM to 1:30 PM) or any other time interface. The user may take affirmative action, such as providing opt-in consent, to allow access to and/or use of user session data 412 and/or source data 414 (e.g., extract, transform, load (ETL) data) associated with accessing content from the content source 403 (e.g., webpages hosted by the webserver).

A first session 406 may be identified as comprising events occurring for a duration that the user interacts with the webpage 404. In an example, the first session 406 may be activated during the first interval (e.g., at 1:02 PM) and terminated 405 during the first interval (e.g., at 1:20 PM). A session may be terminated 405 based upon a session timeout interval occurring without the user interacting with content of the content source and/or the user terminating 405 the session with the content source 403 (e.g., by closing a web browser page, an application, etc.). The session timeout interval may comprise a duration equal to or less than the first interval, a second interval, a third interval, etc. For example, if the first interval is 25 minutes, then the session timeout interval may have a duration of 25 minutes or less or any other timespan.

In an example, the user may access a second webpage 408 during the first interval (e.g., at 1:20 PM). In an example, the user may leave the webpage 404 to navigate to the second webpage 408, thus terminating 405 the first session. In another example, the user may leave the webpage 404 open, but the session timeout interval may expire while the user is accessing the second webpage 408, thus terminating 405 the first session. A second session 410 may be identified as comprising events occurring for a duration that the user interacts with the second webpage 408. In an example, the second session 410 may be activated during the first interval (e.g., at 1:20 PM) but may not be terminated during the first interval.

The session data 412 and the source data 414, corresponding to the first session 406 and the second session 410, may be provided to the sessionization component 418 after the first interval has expired (e.g., at 1:30 PM). The sessionization component 418 may create a data pipeline 416 based upon the session data 412 and the source data 414. The sessionization component 418 may separate the data pipeline 416 into a finished current events interval 420 and an unfinished current events interval 422. In an example, the finished current events interval 420 may comprise one or more sessions (e.g., the first session 406) of the content source 403 that are activated and terminated 405 during the first interval. In an example, the unfinished current events interval 422 may comprise one or more sessions (e.g., the second session 410) of the content source 403 that are activated during the first interval but are not terminated during the first interval. In an example, the finished current events interval 420 may be provided to a publication component 424.

FIG. 4B illustrates the session data 412 and the source data 414 corresponding to the second session 410, a third session 428, and a fourth session 434. The second session 410 may be activated during the first interval, but not terminated until the second interval (e.g., the second interval occurring after the first interval). In an example, the second interval may comprise a second duration of 30 minutes (e.g., from 1:30 PM to 2:00 PM). The user may access a third webpage 426 and/or a fourth webpage 436 during the second interval. The third session 428 may be identified as comprising events occurring for a duration that the user interacts with the third webpage 426. The fourth session 434 may be identified as comprising events occurring for a duration that the user interacts with the fourth webpage 436. In an example, the second session 410 may be terminated 415 during the second interval (e.g., at 1:40 PM). In an example, the third session 428 may be terminated 417 during the second interval (e.g., at 1:57 PM). The fourth session 434 may be activated during the second interval but not terminated during the second interval.

The session data 412 and the source data 414, corresponding to the second session 410, the third session 428, and the fourth session 434, may be provided to the sessionization component 418 after the second interval has expired (e.g., at 2:00 PM). The sessionization component 418 may create the data pipeline 416 based upon the session data 412 and the source data 414. The sessionization component 418 may separate the data pipeline 416 into a second finished current events interval 430, a second unfinished current events interval 432, and a finished last events interval 423. The finished last events interval 423 may comprise events and termination 415 of the second session 410 during the second interval, as provided by the data pipeline 416. The unfinished current events interval 422, comprising the activation and events comprised in the second session 410 during the first interval, may be incorporated into the finished last events interval 423.

In an example, the second finished current events interval 430 may comprise one or more sessions (e.g., the second session 410 and the third session 428) of the content source 403 that are activated and terminated 415, 417 during the second interval. In an example, the second unfinished current events interval 432 may comprise one or more sessions (e.g., the fourth session 434) of the content source 403 that are activated during the second interval but are not terminated during the second interval. In an example, the second finished current events interval 430 and the finished last events interval 423 may be provided to the publication component 424.

FIG. 4C illustrates the session data 412 and the source data 414 corresponding to the fourth session 434 and a fifth session 440. The fourth session 434 may be activated during the second interval, but not terminated until the third interval (e.g., the third interval occurring after the second interval). In an example, the third interval may comprise a third duration of 30 minutes (e.g., from 2:00 PM to 2:30 PM). In an example, the fourth session 434 may be terminated 425 during the third interval (e.g., at 2:21 PM). The user may access a fifth webpage 442 during the third interval (e.g., at 2:21 PM). The fifth session 440 may be activated and terminated 435 (e.g., at 2:28 PM) during the third interval.

The session data 412 and the source data 414, corresponding to the fourth session 434 and the fifth session 440, may be sent to the sessionization component 418 after the third interval has expired (e.g., at 2:30 PM). The sessionization component 418 may create the data pipeline 416 based upon the session data 412 and the source data 414. The sessionization component 418 may separate the data pipeline 416 into a third finished current events interval 431 and a second finished last events interval 433. The second finished last events interval 433 may comprise the events and termination 435 of the fourth session 434 during the third interval, as provided by the data pipeline 416. The second unfinished current events interval 432, comprising the activation and events comprised in the fourth session 434 during the second interval, may be incorporated into the second finished last events interval 433.

In an example, the third finished current events interval 431 may comprise one or more sessions (e.g., the fifth session 440) of the content source 403 that are activated and terminated 435 during the third interval. In an example, the third finished current events interval 431 and the second finished last events interval 433 may be provided to the publication component 424.

Figure 5:
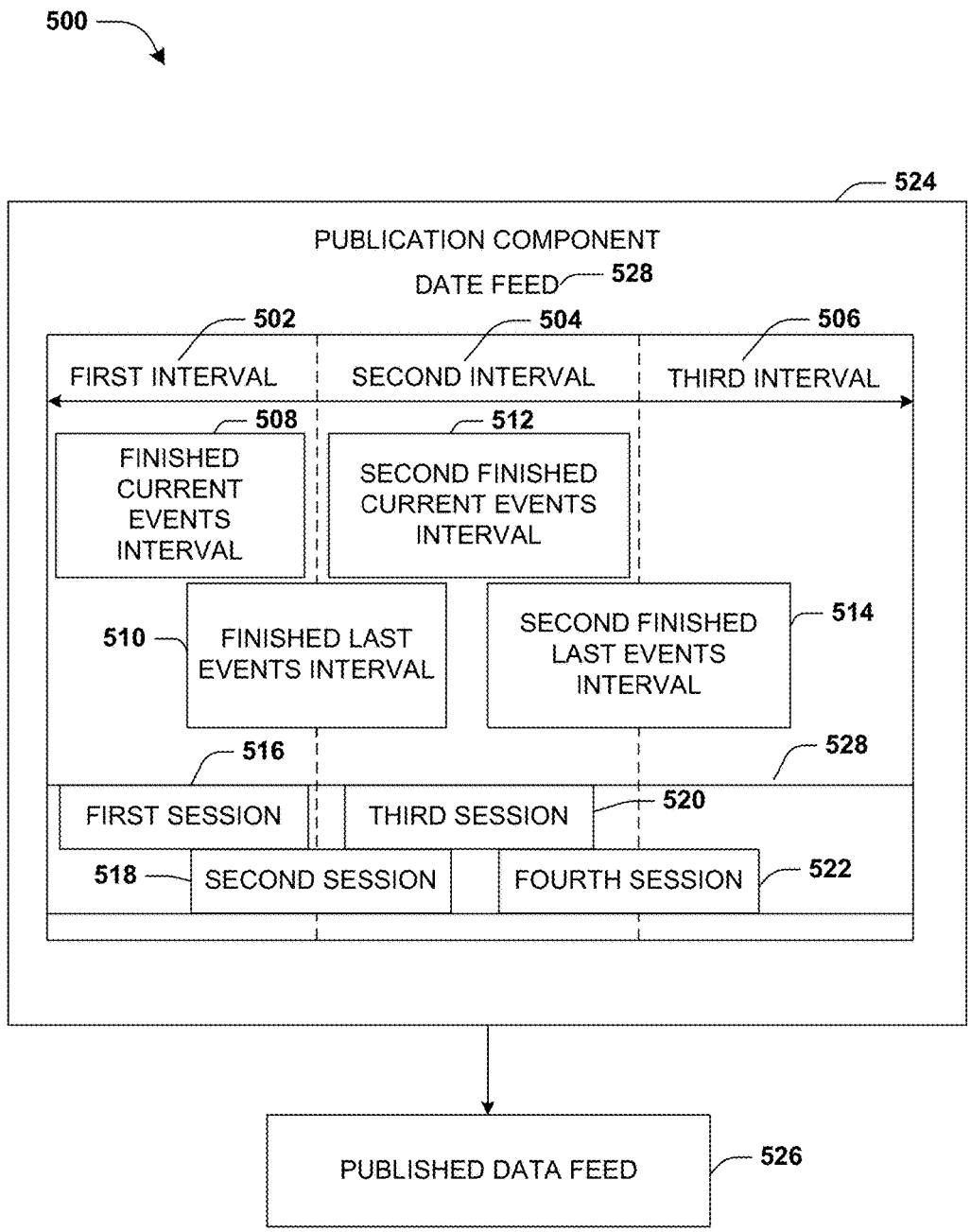
FIG. 5 is a component block diagram illustrating an example system for sessionizing data, where a published data feed is generated.

FIG. 5 illustrates an example of a system 500, comprising a publication component 524, for generating a published data feed 526. The publication component 524 may comprise a finished current events interval 508 corresponding to a first interval 502 (e.g., from 10:00 AM to 11:00 AM). The finished current events interval 508 may comprise a first session 516. The publication component 524 may comprise a finished last events interval 510 corresponding to a second interval 504 (e.g., 11:00 AM to 12:00 PM). The finished last events interval 510 may comprise a second session 518. In an example, the second session 518 may be activated during the first interval 502 and terminated during the second interval 504.

The publication component 524 may comprise a second finished current events interval 512 corresponding to the second interval 504. The second finished current events interval 512 may comprise a third session 520. The publication component 524 may comprise a second finished last events interval 514 corresponding to the third interval 506. The second finished last events interval 514 may comprise a fourth session 522. The first session 516, the second session 518, the third session 520, and the fourth session 522 may comprise a data feed 528.

The publication component 524 may publish the data feed 528 as the published data feed 526. The published data feed 526 may correspond to sessions (e.g., the first session 516, the second session 518, the third session 520, and the fourth session 522) during the first interval 502 and the second interval 504 (e.g., from 10:00 AM to 12:00 PM). In an example, the published data feed 526 comprises information about the fourth session 522 that terminated during the third interval 506, such that the published data feed includes complete information (e.g., activation, events, and termination) about sessions that were activated during the first interval and/or the second interval.

Figure 6:
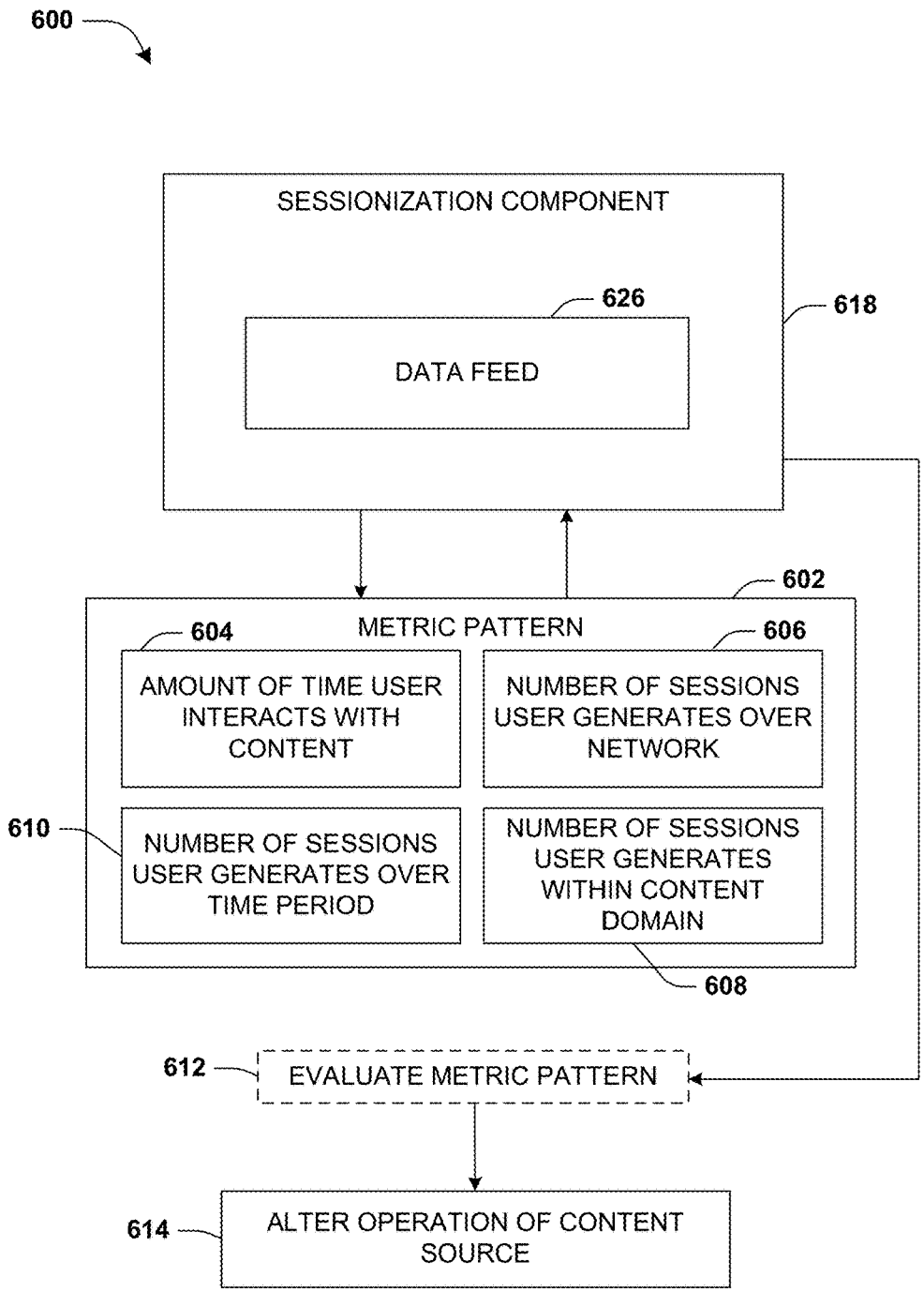
FIG. 6 is a component block diagram illustrating an example system for sessionizing data, where operations of a content source are altered based upon a metric pattern.

FIG. 6 illustrates an example of a system 600 comprising a sessionization component 618 utilizing a data feed 626 to identify a metric pattern 602. The metric pattern 602 may comprise an amount of time a user interacts with content 604 on a content source, a number of sessions the user generates over a network 606 (e.g., a first session, a second session, a third session, etc.), a number of sessions the user generates over a time period 610 (e.g., a first interval, a second interval, etc.), and/or a number of sessions the user generates within a content domain 608 (e.g., within a sports site domain, an entertainment site domain, etc.). The metric pattern 602 may be indicative of multiple user actions. The sessionization component 618 may evaluate 612 the metric pattern 602. Operation of the content source may be altered 614 responsive to the evaluation 612 of the metric pattern 602.

In an example, if the metric pattern 602 indicates that users typically accesses a sports page (e.g., comprising scores and statistics from the previous day) for 20 minutes, then the sessionization component 618 may instruct the content source to allocate resources to facilitate users accessing the sports page for an average of 20 minutes. In an example, if the metric pattern 602 indicates that users typically activates 10 sessions during a duration (e.g., 30 minutes), then the sessionization component 618 may instruct the content source to allocate resources to facilitate users accessing 10 sessions during the duration.

Figure 7:
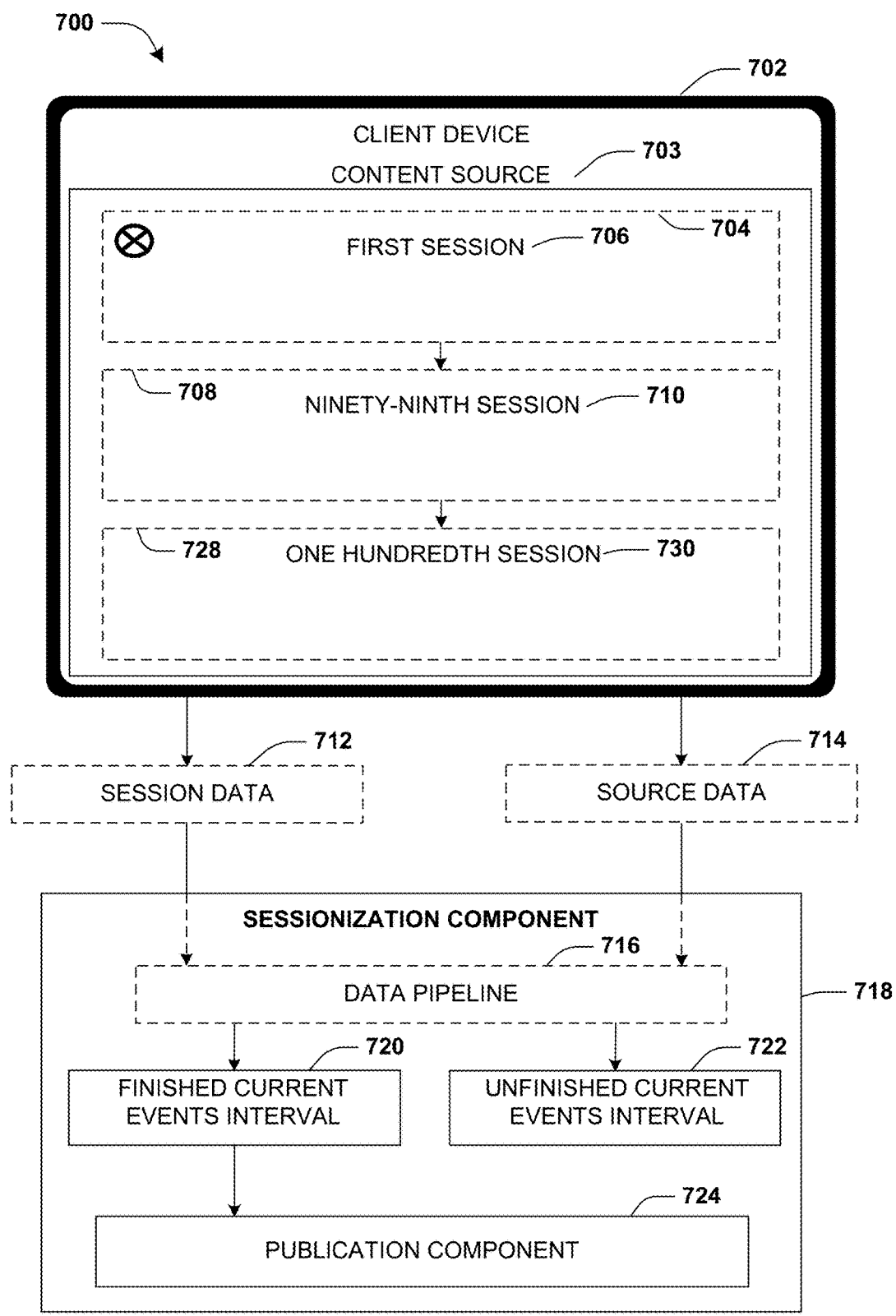
FIG. 7 is a component block diagram illustrating an example system for sessionizing data, where a first session through a one hundredth session are generated.

FIG. 7 illustrates an example of a system 700, comprising a sessionization component 718, for sessionizing user data. A user, on a client device 702, may access content through a content source 703. The user may access 100 web pages during a first interval. A first session 706 may be identified as comprising events occurring for a duration that the user interacts with a webpage 704. A second session through a one hundredth session may be identified as comprising events occurring for a duration that the user interacts with a second webpage through a one hundredth webpage 730, respectively.

In an example, the first session 706 through the ninety-eighth session may be activated and terminated during the first interval. In an example, the user may access a ninety-ninth webpage 708 and the one hundredth webpage 728 during the first interval. A ninety-ninth session 710 may be identified as comprising events occurring for a duration that the user interacts with the ninety-ninth webpage 708. A one hundredth session 730 may be identified as comprising events occurring for a duration that the user interacts with the one hundredth webpage 728.

In an example, the ninety ninth webpage 708 and the one hundredth webpage 728 may be activated during the first interval but may not be terminated during the first interval. Session data 712 and source data 714, corresponding to the first session 706 through the one hundredth session 730, may be provided to the sessionization component 718 after the first interval has expired.

The sessionization component 718 may create a data pipeline 716 based upon the session data 712 and the source data 714. The sessionization component 718 may separate the data pipeline 716 into a finished current events interval 720 (e.g., comprising the first session 706 through the ninety-eighth session) and an unfinished current events interval 722 (e.g., comprising the ninety-ninth session 710 and the one hundredth session 730). In an example, the finished current events interval 720 may be provided to a publication component 724. Separating the data pipeline 716 into the finished current events interval 720 and the unfinished current events interval 722 conserves network bandwidth and computational resources by limiting the number of sessions that may be reported during an interval. For example, by providing sessions that have been activated and terminated in a same interval (e.g., the first session 706 through the ninety-eighth session) and sessions that have been activated and terminated in different intervals (e.g., the ninety-ninth session 710 and the one hundredth session 730), the sessionization component 718 may use reduced session data (e.g., rather than having the session data 712 and source data 714 comprise the first session 706 through the one hundredth session 730 after a second interval, merely the ninety-ninth session 710 and the one hundredth session 730 may be comprised in the session data 712 and the source data 714 after the second interval).

Figure 8:
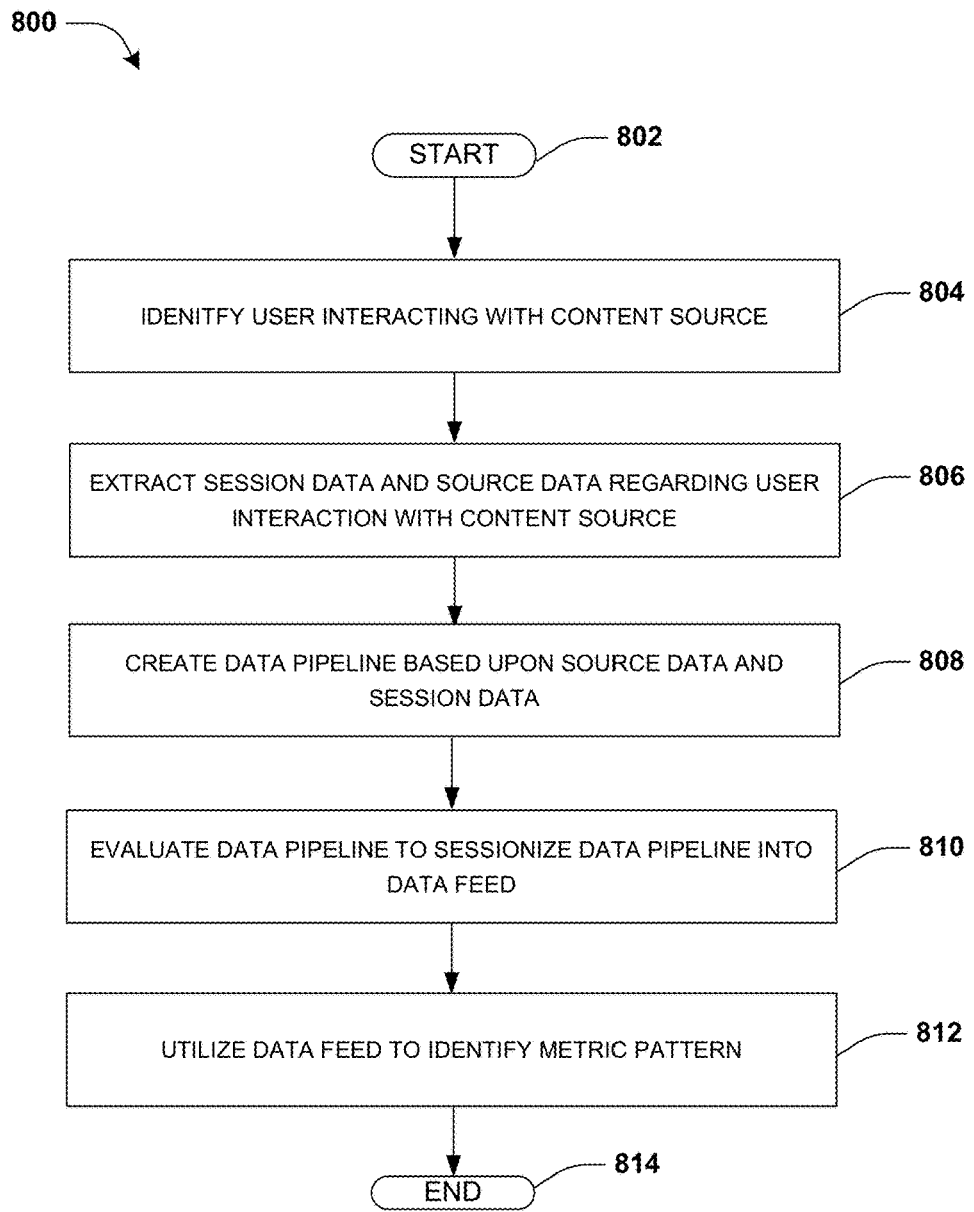
FIG. 8 is a flow chart illustrating an example method of sessionizing data.

An embodiment of sessionizing data is illustrated by an example method 800 of FIG. 8. At 802, the method 800 starts. At 804, a user interacting with a content source may be identified. At 806, source data and session data regarding a user interaction, of the user, with the content source may be extracted. At 808, a data pipeline may be created based upon the source data and the session data. At 810, the data pipeline may be evaluated to sessionize the data pipeline into a data feed. The data pipeline may be evaluated based upon a finished current events interval corresponding to a first interval, a finished last events interval corresponding to a second interval, a second finished current events interval corresponding the second interval, and/or a second finished last events interval corresponding to a third interval. At 812, the data feed may be utilized to identify a metric pattern. At 814, the method 800 ends.

Figure 9:
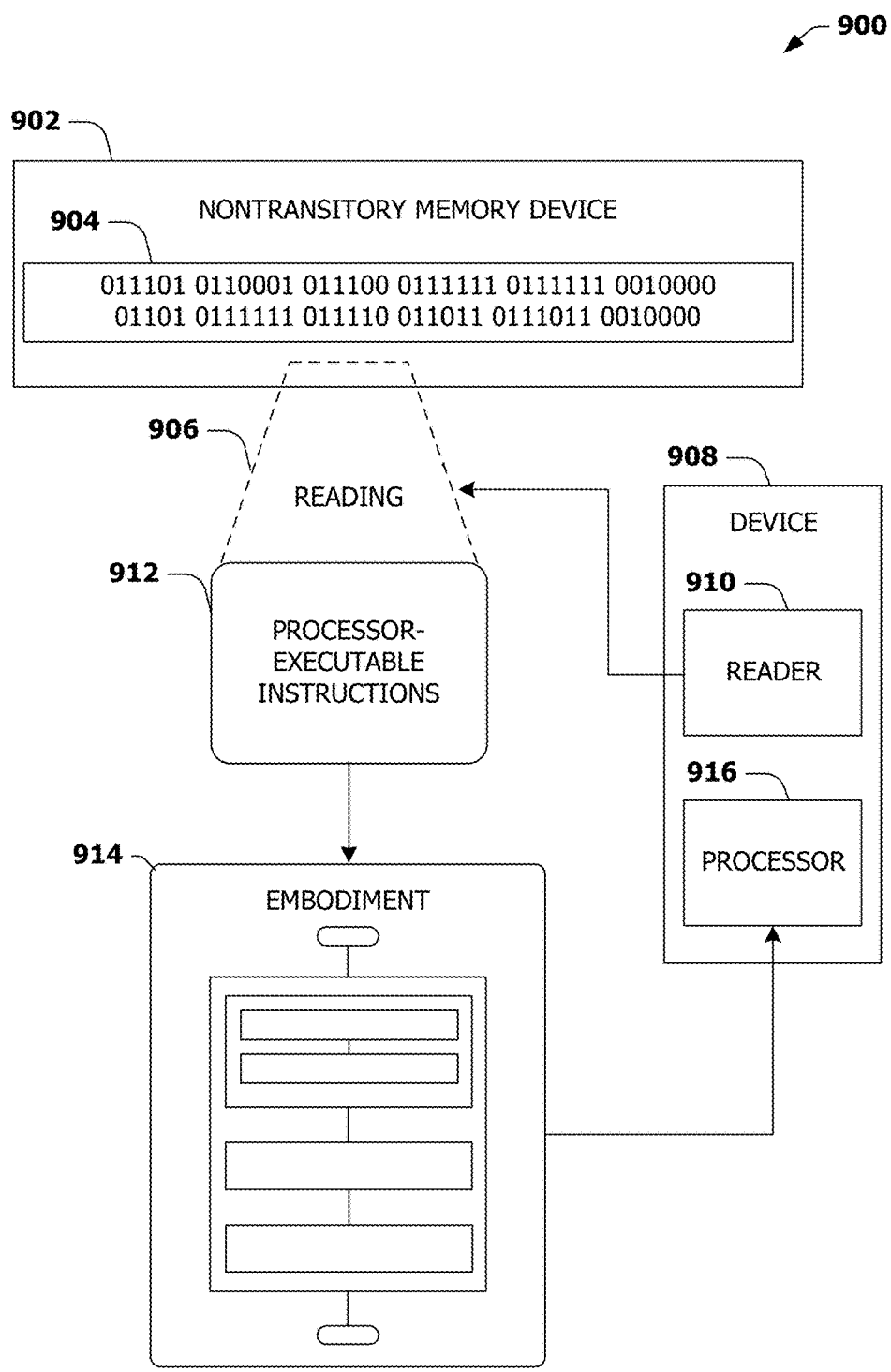
FIG. 9 is an illustration of a scenario featuring an example nontransitory memory device in accordance with one or more of the provisions set forth herein.

FIG. 9 is an illustration of a scenario 900 involving an example nontransitory memory device 902. The nontransitory memory device 902 may comprise instructions that when executed perform at least some of the provisions herein. The nontransitory memory device may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD, DVD, or floppy disk). The example nontransitory memory device 902 stores computer-readable data 904 that, when subjected to reading 906 by a reader 910 of a device 908 (e.g., a read head of a hard disk drive, or a read operation invoked on a solid-state storage device), express processor-executable instructions 912. In some embodiments, the processor-executable instructions, when executed on a processor 916 of the device 908, are configured to perform a method, such as at least some of the example method 800 of FIG. 8, for example. In some embodiments, the processor-executable instructions, when executed on the processor 916 of the device 908, are configured to implement a system, such as at least some of the example system 400 of FIGS. 4A-4C, at least some of the example system 500 of FIG. 5, at least some of the example system 600 of FIG. 6, and/or at least some of the example system 700 of FIG. 7, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A system for sessionization comprising:
a processor; and
memory comprising processor-executable instructions that when executed by the processor cause implementation of a sessionization component configured to:
identify a user interacting with a content source;
extract source data regarding a user interaction, of the user, with the content source from an extract, transform, load (ETL) data feed;
extract session data regarding the user interaction, of the user, with the content source from a session data feed different than the ETL data feed;
create a data pipeline based upon the source data from the ETL data feed and the session data from the session data feed;
evaluate the data pipeline to sessionize the data pipeline with the source data from the ETL data feed and the session data from the session data feed into a single data feed comprising information about a first session, a second session after the first session, a third session after the second session and a fourth session after the third session based upon:
a finished current events interval corresponding to a first interval and comprising the first session;
a finished last events interval corresponding to the first interval and a second interval and comprising the second session;
a second finished current events interval corresponding the second interval and comprising the third session; and
a second finished last events interval corresponding to the second interval and a third interval and comprising the fourth session,
wherein the sessionizing comprises:
combining first session data of the first interval and first source data of the first interval to generate first interval data for the first interval;
separating the first interval data into the finished current events interval and an unfinished current events interval, wherein the finished current events interval is provided to a publication component, configured to generate the single data feed, after the first interval has expired, wherein the publication component is implemented via execution of the processor-executable instructions,
combining second session data of the second interval and second source data of the second interval to generate second interval data for the second interval;
separating the second interval data into a portion of the finished last events interval, the second finished current events interval and a second unfinished current events interval;
incorporating the unfinished current events interval into the portion of the finished last events interval to generate the finished last events interval, wherein the finished last events interval and the second finished current events interval are provided to the publication component, configured to generate the single data feed, after the second interval has expired,
combining third session data of the third interval and third source data of the third interval to generate third interval data for the third interval;
separating the third interval data into a portion of the second finished last events interval and a third finished current events interval; and
incorporating the second unfinished current events interval into the portion of the second finished last events interval to generate the second finished last events interval, wherein the second finished last events interval and the third finished current events interval are provided to the publication component, configured to generate the single data feed, after the third interval has expired;
utilize the single data feed to identify a metric pattern; and
alter operation of the content source based upon an evaluation of the metric pattern identified utilizing the single data feed comprising the source data from the ETL data feed and the session data from the session data feed.

2. The system of claim 1, wherein the content source is a website hosted by a webserver.

3. The system of claim 1, the finished last events interval comprising one or more sessions of the content source that are activated during the first interval and terminated during the second interval.

4. The system of claim 1, the second finished current events interval comprising one or more sessions of the content source that are activated and terminated during the second interval.

5. The system of claim 1, the second finished last events interval comprising one or more sessions of the content source that are activated during the second interval and terminated during the third interval.

6. The system of claim 1, the sessionization component configured to:
terminate a session based upon at least one of:
a session timeout interval occurring without the user interacting with content of the content source; or
the user terminating the session with the content source.

7. The system of claim 6, the session timeout interval comprising a duration equal to or less than at least one of the first interval, the second interval, or the third interval.

8. The system of claim 1, the unfinished current events interval corresponding to the first interval and comprising the second session.

9. The system of claim 1, the metric pattern comprising a number of sessions the user generates over a time period, the altering comprising altering operation of the content source based upon an evaluation of the number of sessions the user generates over the time period.

10. The system of claim 1, the metric pattern comprising a number of sessions the user generates, the altering comprising altering operation of the content source based upon an evaluation of the number of sessions the user generates.

11. The system of claim 1, the second unfinished current events interval corresponding to the second interval and comprising the fourth session.

12. A method for sessionization comprising:
identifying a user interacting with a content source;
extracting source data regarding a user interaction, of the user, with the content source from an extract, transform, load (ETL) data feed;
extracting session data regarding the user interaction, of the user, with the content source from a session data feed different than the ETL data feed;
creating a data pipeline based upon the source data from the ETL data feed and the session data from the session data feed;

evaluating the data pipeline to sessionize the data pipeline with the source data from the ETL data feed and the session data from the session data feed into a single data feed based upon:
- a finished current events interval corresponding to a first interval;
- a finished last events interval corresponding to a second interval;
- a second finished current events interval corresponding the second interval; and
- a second finished last events interval corresponding to a third interval, wherein the sessionizing comprises:
  - combining first session data of the first interval and first source data of the first interval to generate first interval data for the first interval;
  - separating the first interval data into the finished current events interval and an unfinished current events interval, wherein the finished current events interval is provided to a publication component, configured to generate the single data feed, after the first interval has expired, wherein the publication component is implemented via execution of processor-executable instructions;
  - combining second session data of the second interval and second source data of the second interval to generate second interval data for the second interval;
  - separating the second interval data into a portion of the finished last events interval, the second finished current events interval and a second unfinished current events interval;
  - incorporating the unfinished current events interval into the portion of the finished last events interval to generate the finished last events interval, wherein the finished last events interval and the second finished current events interval are provided to the publication component, configured to generate the single data feed, after the second interval has expired;
utilizing the single data feed to identify a metric pattern; and
altering operation of the content source based upon an evaluation of the metric pattern.

13. The method of claim 12, wherein the second interval is after the first interval and the third interval is after the second interval.

14. The method of claim 12, the finished current events interval comprising one or more sessions of the content source that are activated and terminated during the first interval.

15. The method of claim 12, the finished last events interval comprising one or more sessions of the content source that are activated during the first interval and terminated during the second interval.

16. The method of claim 12, the second finished current events interval comprising one or more sessions of the content source that are activated and terminated during the second interval.

17. The method of claim 12, the second finished last events interval comprising one or more sessions of the content source that are activated during the second interval and terminated during the third interval.

18. The method of claim 12, comprising:
- identifying a first session as comprising events occurring for a duration that the user interacts with a webpage; and
- identifying a second session as comprising events occurring for a second duration that the user interacts with a second webpage.

19. The method of claim 12, comprising:
terminating a session based upon at least one of:
- the user terminating the session with the content source; or
- a session timeout interval occurring without the user interacting with content of the content source, the session timeout interval comprising a duration equal to or lesser than at least one of the first interval, the second interval, or the third interval.

20. A system for sessionization comprising:
a processor; and
memory comprising processor-executable instructions that when executed by the processor cause implementation of a sessionization component configured to:
- identify a user interacting with a content source;
- extract source data regarding a user interaction, of the user, with the content source;
- extract session data regarding the user interaction, of the user, with the content source;
- create a data pipeline based upon the source data and the session data;
- evaluate the data pipeline to sessionize the data pipeline into a single data feed comprising information about a first session, a second session, a third session and a fourth session based upon:
  - a finished current events interval corresponding to a first interval and comprising the first session;
  - a finished last events interval corresponding to a second interval and comprising the second session;
  - a second finished current events interval corresponding the second interval and comprising the third session; and
  - a second finished last events interval corresponding to a third interval and comprising the fourth session,
wherein the sessionizing comprises:
  - combining first session data of the first interval and first source data of the first interval to generate first interval data for the first interval;
  - separating the first interval data into the finished current events interval and an unfinished current events interval, wherein the finished current events interval is provided to a publication component, configured to generate the single data feed, after the first interval has expired, wherein the publication component is implemented via execution of the processor-executable instructions,
  - combining second session data of the second interval and second source data of the second interval to generate second interval data for the second interval;
  - separating the second interval data into a portion of the finished last events interval, the second finished current events interval and a second unfinished current events interval;
  - incorporating the unfinished current events interval into the portion of the finished last events interval to generate the finished last events interval, wherein the finished last events interval and the second finished current events interval are provided to the publication component, configured to generate the single data feed, after the second interval has expired,
  - combining third session data of the third interval and third source data of the third interval to generate third interval data for the third interval;

separating the third interval data into a portion of the second finished last events interval and a third finished current events interval; and incorporating the second unfinished current events interval into the portion of the second finished last events interval to generate the second finished last events interval, wherein the second finished last events interval and the third finished current events interval are provided to the publication component, configured to generate the single data feed, after the third interval has expired.

\* \* \* \* \*